(12) United States Patent
Yushiya

(10) Patent No.: US 6,687,413 B2
(45) Date of Patent: Feb. 3, 2004

(54) SIGNAL PROCESSING APPARATUS

(75) Inventor: Akihiko Yushiya, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 580 days.

(21) Appl. No.: 09/730,387

(22) Filed: Dec. 6, 2000

(65) Prior Publication Data

US 2001/0051006 A1 Dec. 13, 2001

(30) Foreign Application Priority Data

Dec. 7, 1999 (JP) ............................................. 11-347855
Jun. 14, 2000 (JP) ......................................... 2000-178294

(51) Int. Cl.[7] ................................................ G06K 9/40
(52) U.S. Cl. ...................... 382/262; 708/304; 708/202
(58) Field of Search .......................... 382/262; 708/304, 708/202, 300, 207; 348/446, 565, 620, 721, 625, 630, 631, 675; 358/509, 505, 513; 345/506, 545, 501, 502

(56) References Cited

U.S. PATENT DOCUMENTS 5,144,568 A * 9/1992 Glover ........................ 708/202
5,898,510 A  4/1999 Kaihotsu et al. ............ 358/509

FOREIGN PATENT DOCUMENTS

JP  5-233804 A  9/1993  ........... G06F/15/68

* cited by examiner

Primary Examiner—Timothy M. Johnson
Assistant Examiner—Ali Bayat
(74) Attorney, Agent, or Firm—Fitzpatrick, Cella, Harper & Scinto

(57) ABSTRACT

A system to minimize the number of comparison and rearrangement operations and increase the processing speed with a small circuit scale utilizing a median filter in the form of hardware. A signal processing apparatus for performing, when a region to be subjected to signal processing has shifted, signal processing of pixel signals in a region to be subjected to signal processing after shifting the region, by utilizing old pixel signals already subjected to signal processing before the shift of the region. The apparatus includes a new-data-order determination circuit for determining an order of magnitude of pixel signals newly added to a region to be subjected signal processing after the shift of the region. A new-data selection circuit rearranges the new pixel signals based on the determined order. An all-data-order determination circuit determines the order of magnitude of all signals by comparing the rearranged new pixel signals with the old pixel signals. An all-data selection circuit rearranges pixel signals in a region to be subjected to signal processing after the shift of the region, based on the determined order of magnitude.

24 Claims, 20 Drawing Sheets

FIG.2

| C1 | C4 | C7 | C10 |
|----|----|----|-----|
| C2 | C5 | C8 | C11 |
| C3 | C6 | C9 | C12 |

FIG.11

| C1 | C4 | C7 | C10 |
|----|----|----|-----|
| C2 | C5 | C8 | C11 |
| C3 | C6 | C9 | C12 |

FIG.14

| C1 | C6 | C11 | C16 | C21 | C26 |
|----|----|-----|-----|-----|-----|
| C2 | C7 | C12 | C17 | C22 | C27 |
| C3 | C8 | C13 | C18 | C23 | C28 |
| C4 | C9 | C14 | C19 | C24 | C29 |
| C5 | C10 | C15 | C20 | C25 | C30 |

FIG.16

| C1 | C6 | C11 | C16 | C21 | C26 |
|----|----|-----|-----|-----|-----|
| C2 | C7 | C12 | C17 | C22 | C27 |
| C3 | C8 | C13 | C18 | C23 | C28 |
| C4 | C9 | C14 | C19 | C24 | C29 |
| C5 | C10 | C15 | C20 | C25 | C30 |

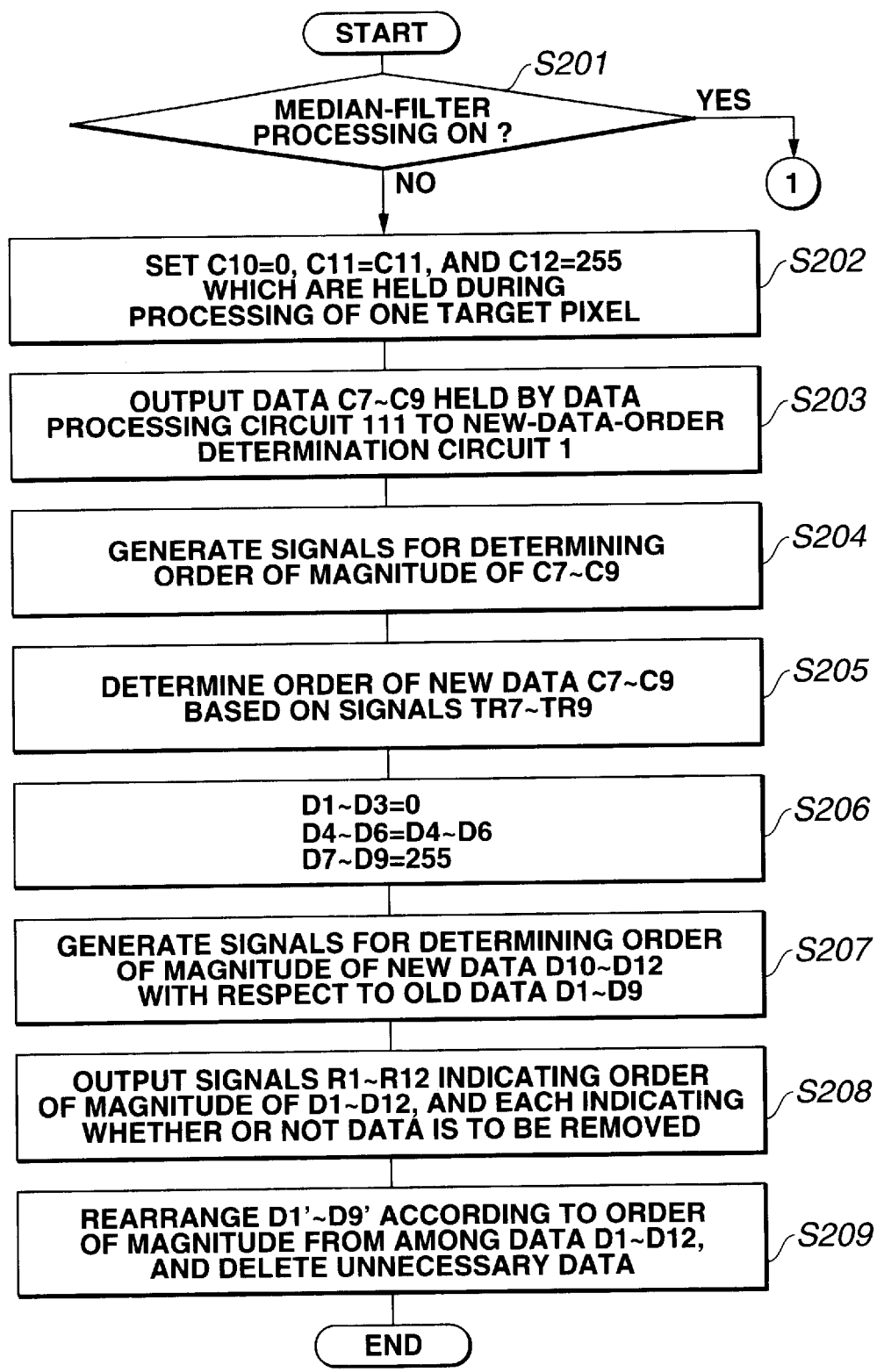

SIGNAL PROCESSING APPARATUS

BACKGROUND OF THE INVENTION

1. Field of the Invention

The present invention relates to a signal processing apparatus for processing pixel signals by a predetermined range, and more particularly, to a median filter for reducing noise included in input image data and the like.

2. Description of the Related Art

A median filter can be used to perform processing of setting a pixel region having a predetermined size around each pixel and replacing original data possessed by the pixel with a median of all data within the surrounding pixel region. The median filter is capable of removing an isolated point, such as spike noise, without impairing the resolution of image data, and is often used as a function of image processing software in a computer.

Recently, in accordance with an increasing demand for obtaining an image comparable to an image obtained by a silver-halide camera by increasing the number of pixels of a digital camera, the number of pixels of an image sensor has been increased, and signal processing for realizing higher picture quality has been requested. Digital cameras generally use a single image sensor having color filters from the viewpoint of reducing the size and the cost of the camera. Usually, if it is intended to obtain high resolution in an image, false colors caused by the arrangement of color filters are generated. If it is intended to prevent false colors, the resolution is degraded. Accordingly, in order to obtain a high-resolution image with accurate color reproduction, it is desired to provide a median filter in the form of hardware.

Japanese Patent Application Laid-Open (Kokai) No. 5-233804 (1993) relates to a conventional example of realization of a median filter in the form of hardware. FIGS. 18A–18G illustrate the flow of data processing of such a filter. FIG. 2 illustrates the relationship between respective data C1–C12 shown in FIGS. 18A–18G, and pixel positions. In the following description, the same reference numeral is used for a pixel and image data output form the pixel.

It is assumed that in an initial state, the signal levels of respective data C1–C9 in a pixel region surrounded by solid lines shown in FIG. 2 are ranked in the order of magnitude, and ranked pixels are arranged in the order of magnitude as shown in FIG. 18A. Although the target pixel at that time is a central pixel C5 in the image region surrounded by the solid lines, data C3 at the center of the arrangement of the data C1–C9 is output from the median filter as data for this target pixel after filtering processing, instead of the data C5.

If the target pixel shifts from the pixel C5 to the right by one, i.e., to a pixel C8, the image region to be processed by the median filter becomes a region including pixels C4–C12 surrounded by broken lines. First, processing of searching for data of a pixel C1 from among data that become unnecessary because they leave the new pixel region, and deleting the data from the group of ranked data is performed. Address data indicating the position within the pixel region is added to each data. For example, XY coordinates (0,0) in a system comprising remainders of 3 is added to the data C1. Hence, the data C1 is specified from the nine data C1–C9 utilizing the XY coordinates (0,0).

After searching for the data C1, eight data other than the data C1 are rearranged to provide a state in which eight data other than the data C1 are ranked as shown in FIG. 18B. Since only one data has been deleted, the order of magnitude of each of the eight data is either the same as before or an order lower than the previous order by one.

Next, the magnitude of data C10 from among three data newly added to the pixel region to be processed by the median filter is compared with the magnitudes of the eight ranked data to determine the order of magnitude of the data C10, and the nine data are rearranged in accordance with the new order. For example, if the value of the data C10 is between data C4 and C2, the order shown in FIG. 18C is obtained. At that time, since only one data is newly added, the order of each of the eight data is either the same as before or an order higher than the previous order by one.

Next, the data of a pixel C2 is searched for from among data that become unnecessary because they leave the new image region, and is deleted from the group of the ranked data. At that time, the search of the data C2 is performed utilizing xy coordinates (0,1) added to the data C2, and the data C2 is specified from among the nine data. Then, eight data other than the data C2 are rearranged to provide a state in which eight data other than the data C2 are ranked as shown in FIG. 18D. Next, the magnitude of data C11 from among the three data newly added to the pixel region to be processed by the median filter is compared with the magnitudes of the eight ranked data to determine the order of the data C11, and the nine data are rearranged in accordance with the new order. For example, if the value of the data C11 is between data C7 and C3, the order shown in FIG. 18E is obtained.

By searching for data of a pixel C3 in the same procedure, eight data other than the data C3 are rearranged as shown in FIG. 18F. After determining the order of data C12 by comparing the magnitude of the data C12 with the magnitudes of eight ranked data, the nine data are rearranged in accordance with the new order as shown in FIG. 18G.

Thus, data can be rearranged in the order of magnitude in the new pixel region C4–C12. In this case, the output of the median filter for the target pixel C8 in the pixel region is data C11 in the center of the order of magnitude of the signal levels of the data C4–C11.

According to the above-described approach, the order of magnitude of the group of data to be subjected to filtering processing when performing filtering processing of the immediately preceding target pixel can be utilized. Hence, it is possible to reduce the number of comparison operations than in a case in which the comparison of the magnitudes of all data to be subjected to filtering processing is newly performed for each target pixel, and therefore this approach is effective. Furthermore, since the removal of data and the addition of data relative to the group of ranked data are performed one by one, the movement of data is limited to an adjacent position. As a result, it is relatively easy to realize a median filter in the form of hardware.

However, in the above-described conventional approach, since the removal of unnecessary data, the calculation of the order of magnitude of new data, and the rearrangement of data are performed for each data, the number of operations of comparison and rearrangement of data increases, resulting in an increase in the processing time. Furthermore, as the size of the image region to be subjected to filtering processing increases, the signal processing time for one target pixel increases in proportion to the since of the image region. As a result, high-speed signal processing cannot be performed.

SUMMARY OF THE INVENTION

The present invention has been made in consideration of the above-described problems.

It is an object of the present invention to minimize the number of operations of comparison and rearrangement of data and increase the processing speed with a small circuit scale, when utilizing a median filter in the form of hardware.

One embodiment relates to a signal processing apparatus for setting a region having a predetermined size in order to process pixel signals in an image pickup device, shifting the set region, and performing signal processing based on pixel signals within each region by sequentially shifting the region. The apparatus includes a first new-data-order determination unit that determines an order of magnitude of levels of pixel signals to be newly subjected to signal processing as a result of shift of the region. A new-data rearrangement unit rearranges new pixel signals to be newly subjected to signal processing, based on the order of magnitude determined by the first new-data-order determination unit. A second new-data-order determination unit determines an order of magnitude of new pixel signals obtained by combining the new pixel signals rearranged by the new-data rearrangement unit and old pixel signals which have been subjected to signal processing before the shift of the region, and an order of magnitude of signal levels of which have been determined, by comparing levels of the new pixel signals rearranged by the new-data rearrangement means with the levels of the old pixel signals. An all-data-order determination unit determines an order of magnitude of signal levels of all pixels obtained by combining the new pixel signals and the old pixel signals, based on the order of magnitude of the new pixel signals determined by the second new-data-order determination unit. An all-data rearrangement unit rearranges signals of the all pixels, based on the order of magnitude of the signal levels of all the pixels determined by the all-data-order determination unit.

Another embodiment relates to a signal processing method for setting a region having a predetermined size in order to process pixel signals in an image pickup device, shifting the set region, and performing signal processing based on pixel signals within each region by sequentially shifting the region. The method includes a first new-data-order determination step of determining an order of magnitude of levels of pixel signals to be newly subjected to signal processing as a result of shift of the region, a new-data rearrangement step of rearranging new pixel signals to be newly subjected to signal processing, based on the order of magnitude determined in the first new-data-order determination step. A second new-data-order determination step determines an order of magnitude of new pixel signals obtained by combining the new pixel signals rearranged in the new-data rearrangement step and old pixel signals which have been subjected to signal processing before the shift of the region, and an order of magnitude of signal levels of which have been determined, by comparing levels of the new pixel signals rearranged in the new-data rearrangement step with the levels of the old pixel signals. An all-data-order determination step determines an order of magnitude of signal levels of all pixels obtained by combining the new pixel signals and the old pixel signals, based on the order of magnitude of the new pixel signals determined in the second new-data-order determination step. An all-data rearrangement step rearranges signals of all the pixels, based on the order of magnitude of the signal levels of all the pixels determined in the all-data-order determination step.

Yet another embodiment relates to a storage medium storing a program for a signal processing method for setting a region having a predetermined size in order to process pixel signals in an image pickup device, sequentially shifting the set region, and performing signal processing based on pixel signals within each region by sequentially shifting the region. The method includes a first new-data-order determination step of determining an order of magnitude of levels of pixel signals to be newly subjected to signal processing as a result of shift of the region. A new-data rearrangement step rearranges new pixel signals to be newly subjected to signal processing, based on the order of magnitude determined in the first new-data-order determination step. A second new-data-order determination step determines an order of magnitude of new pixel signals obtained by combining the new pixel signals rearranged in the new-data rearrangement step and old pixel signals which have been subjected to signal processing before the shift of the region, and an order of magnitude of signal levels of which have been determined, by comparing levels of the new pixel signals rearranged in the new-data rearrangement step with the levels of the old pixel signals. An all-data-order determination step determines an order of magnitude of signal levels of all pixels obtained by combining the new pixel signals and the old pixel signals, based on the order of magnitude of the new pixel signals determined in the second new-data-order determination step. An all-data rearrangement step rearranges signals of all the pixels, based on the order of magnitude of the signal levels of all the pixels determined in the all-data-order determination step.

The foregoing and other objects, advantages and features of the present invention will become more apparent from the following description of the preferred embodiments taken in conjunction with the accompanying drawings.

BRIEF DESCRIPTION OF THE DRAWINGS

FIG. 2 is a diagram illustrating the positional relationship between a region to be subjected to filtering processing and a target pixel;

FIG. 11 is a diagram illustrating the positional relationship between a region to be subjected to filtering processing and a target pixel when the filtering processing is not performed in the second embodiment;

FIG. 14 is a diagram illustrating the positional relationship between a region to be subjected to filtering processing and a target pixel in a third embodiment of the present invention;

FIG. 16 is a diagram illustrating the positional relationship between a region to be subjected to filtering processing and a target pixel when the region to be subjected to filtering processing is changed in the third embodiment;

FIG. 20 is a flowchart illustrating filtering processing in the second embodiment.

DESCRIPTION OF THE PREFERRED EMBODIMENTS

Figure 1:
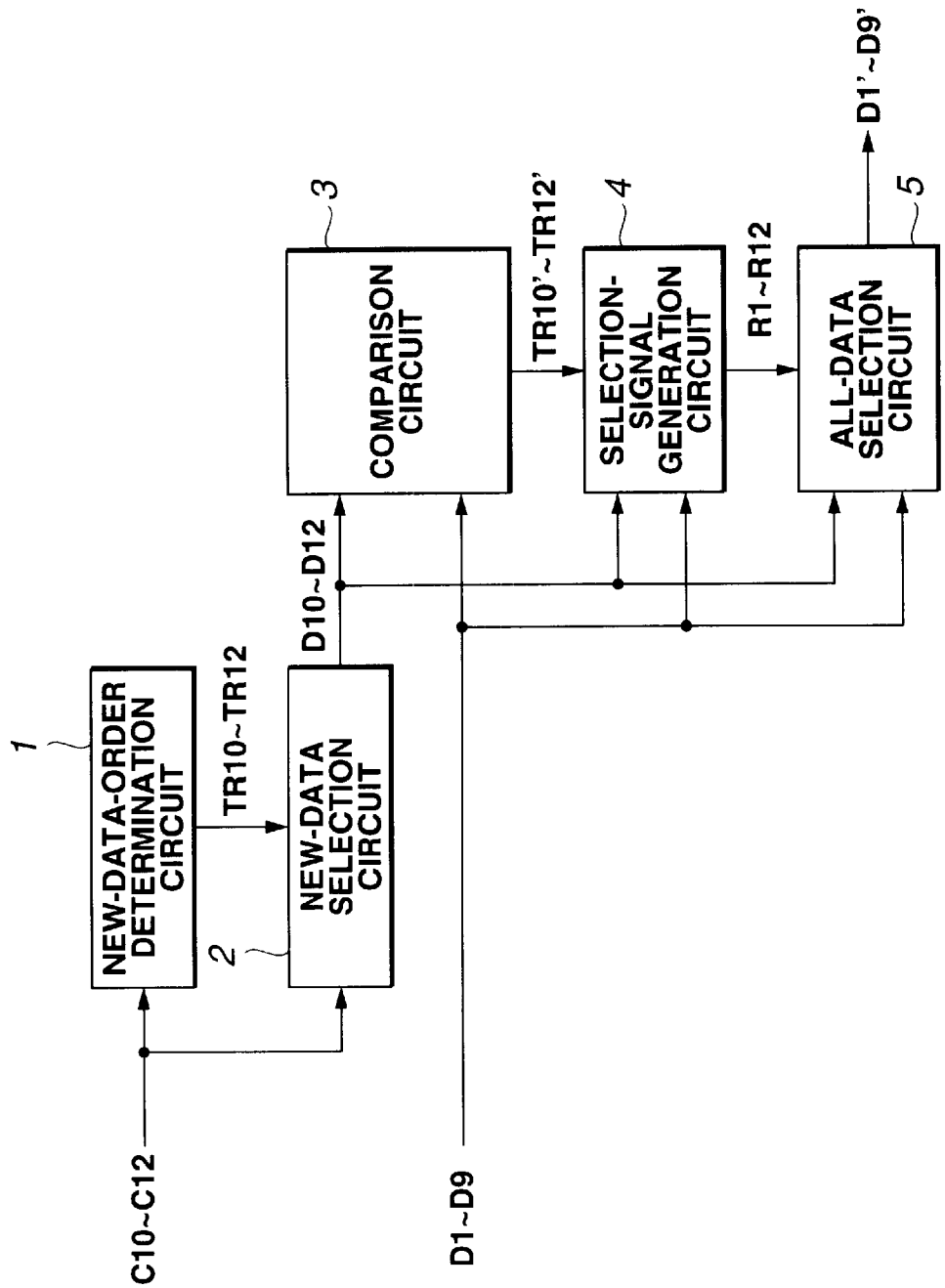
FIG. 1 is a block diagram illustrating the configuration of a median filter according to a first embodiment of the present invention.

Preferred embodiments of the present invention will now be described in detail with reference to the drawings.

Figure 2:
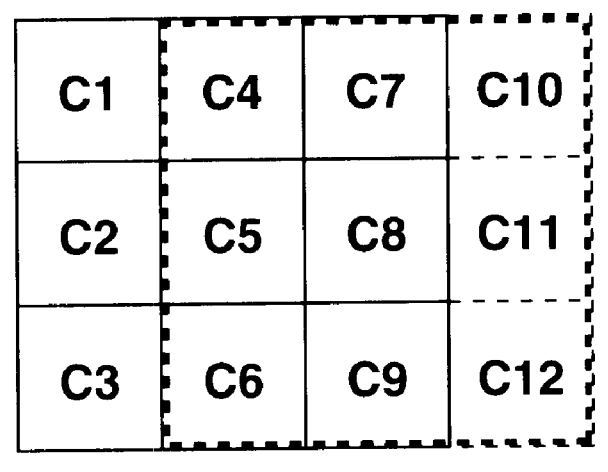

First, a description will be provided of a case in which a pixel region to be subjected to median-filter processing includes 3×3 pixels, according to an embodiment of the present invention. FIG. 2 is a diagram illustrating the positional relationship between a region to be subjected to filtering processing and a target pixel in the first embodiment. In FIG. 2, a pixel region including pixels C1–C9 surrounded by solid lines is a region to be subjected to filtering processing when a pixel CS is made a target pixel. When the target pixel shifts to the right by one from C5 to C8, the pixel region to be subjected to filtering processing shifts from the region including the pixels C1–C9 surrounded by the solid lines to a region including pixels C4–C12 surrounded by broken lines. Accordingly, during filtering processing, the data of pixels C1–C3 become unnecessary, and the data of pixels C10–C12 newly become necessary. In the following description, a pixel and data output from the pixel are referred to using the same reference numeral.

Figure 19:
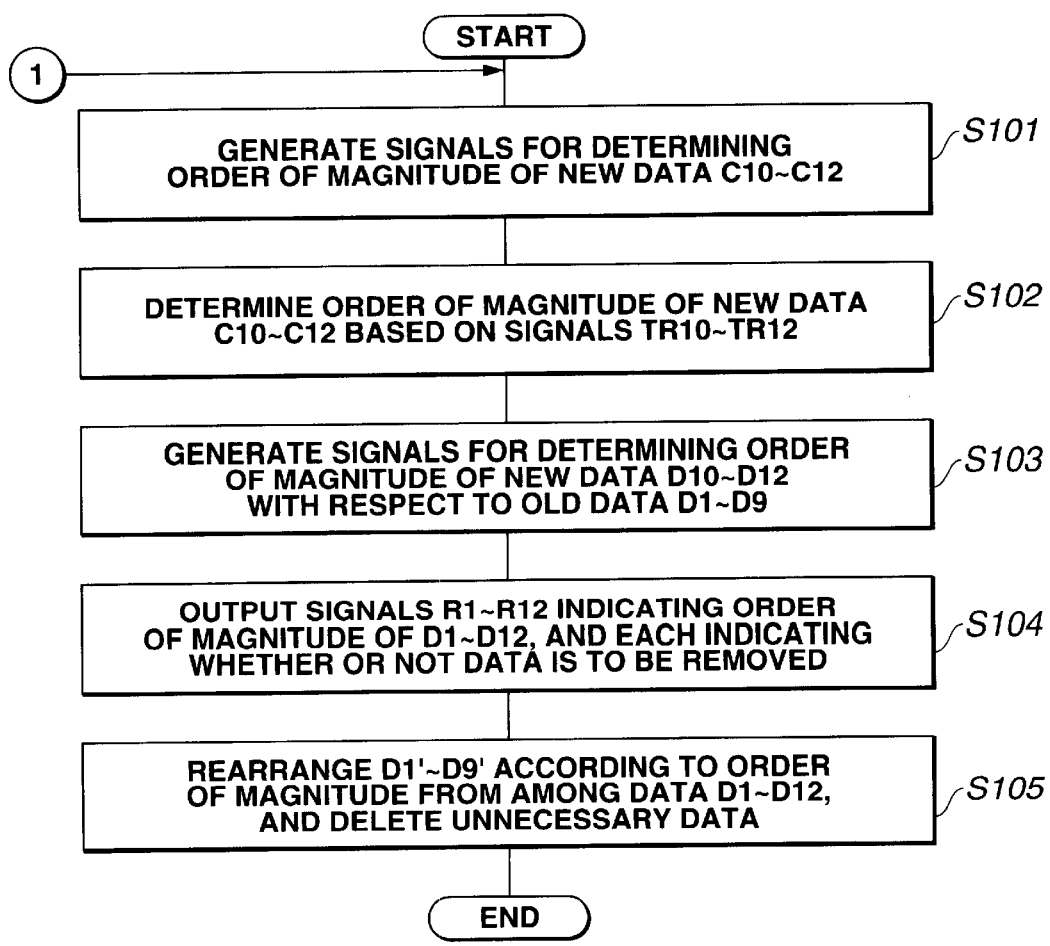
FIG. 19 is a flowchart illustrating filtering processing in the first embodiment.

FIG. 1 is a block diagram illustrating the configuration of a median filter according to the embodiment. FIG. 19 is a flowchart illustrating a processing procedure in the configuration shown in FIG. 1. In FIG. 1, a new-data-order determination circuit 1 compares the magnitudes of signal levels of data C10–C12, which have been newly added to the region to be subjected to filtering processing, with one another, and determines the order of magnitude of the signal levels of these new data. A new-data selection circuit 2 rearranges the new data C10–C12 in accordance with the order of magnitude determined by the new-data-order determination circuit 1. A comparison circuit 3 compares the signal levels of data D1–D9 which are included in the region to be subjected to filtering processing for an immediately preceding target pixel and which already have been ranked, with the signal levels of new data D10–D12. A selection-signal generation circuit 4 generates selection signals for arranging the old data and the new data in the order of magnitude of signal levels. An all-data selection circuit 5 rearranges data necessary even when the target pixel shifts by one from among the old data, and the new data in the order of magnitude of signal levels, based on the selection signals output from the selection-signal generation circuit 4.

Next, signal processing of each of these circuits in the above-described configuration will be described in detail.

Figure 3:
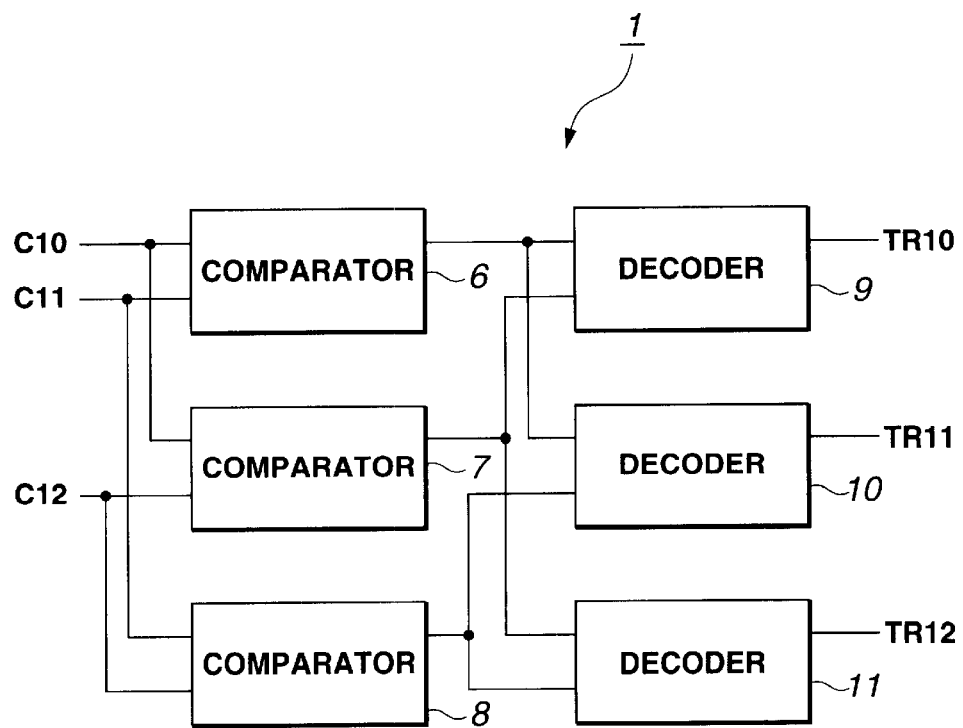
FIG. 3 is a block diagram illustrating the internal configuration of a new-data-order determination circuit shown in FIG. 1.

First, the new-data-order determination circuit 1 compares the signal levels of the new data C10–C12 newly added to the region to be subjected to filtering processing when the target pixels shifts from C5 to C8, and determines the order of magnitude of the new data C10–C12 (step S101). FIG. 3 illustrates the internal configuration of the new-data-order determination circuit 1. The new-data-order determination circuit 1 includes three comparators 6–8, each for comparing two data from among the new data C10–C12, and three decoders 9–11 for outputting selection signals TR10–TR12 indicating the orders of magnitude of the data C10–C12 depending on output signals from the comparators 6–8, respectively.

In the above-described configuration, the comparators 6–8 are connected in parallel. The comparator 6 outputs 1 or 0 if the value of the data C10 is larger or smaller than the value of the data C11, respectively. Similarly, the comparators 7 and 8 output 1 or 0 depending on the values of the data C10 and C12, and the values of the data C11 and C12. The decoders 8–10 are connected in parallel after the comparators 6–8, respectively. The results of comparison between the data C10 and C11, and between the data C10 and C12 are input to the decoder 9, which outputs a selection signal TR10 indicating the order of magnitude of the data C10 within the data C10–C12. Similarly, the results of comparison between the data C10 and C11, and between the data C11 and C12 are input to the decoder 10, which outputs a selection signal TR11 indicating the order of magnitude of the data C11 within the data C10–C12. The results of comparison between the data C10 and C12, and between the data C11 and C12 are input to the decoder 11, which outputs a selection signal TR12 indicating the order of magnitude of the data C12 within the data C10–C12.

Figure 4:
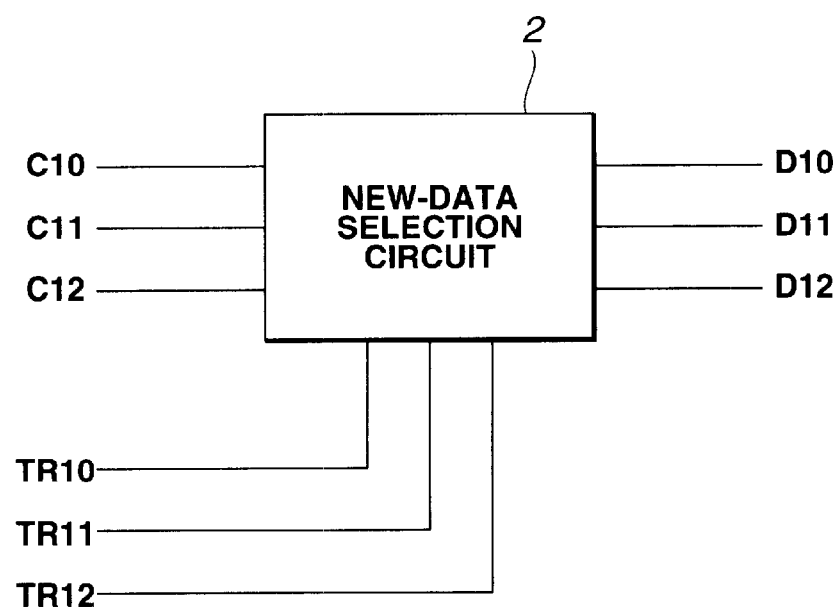
FIG. 4 is a block diagram illustrating input/output signals to/from a new-data selection circuit shown in FIG. 1.

By inputting the new data C10–C12, and the selection signals TR10–TR12 output from the new-data-order determination circuit 1 to the new-data selection circuit 2 (see FIG. 4), the new data C10–C12 are rearranged as D10, D11 and D12 which are in the relationship of D10<D11<D12, in the ascending order of the signal levels of the new data C10–C12 (step S102).

Figure 9A:
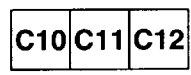
FIGS. 9A–9C are diagrams illustrating a schematic procedure of rearrangement of signals according to the first embodiment.
Figure 9B:
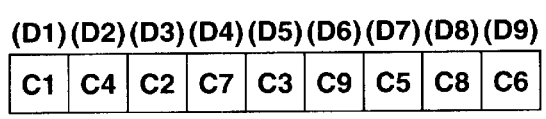
Figure 9B:
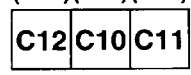

If the data C10–C12 have the relationship of C12<C10<C11, the data C10–C12 which are initially arranged as shown in FIG. 9A are rearranged as shown in FIG. 9B. In this case, D10=C12, D11=C10, and D12=C11.

Figure 5:
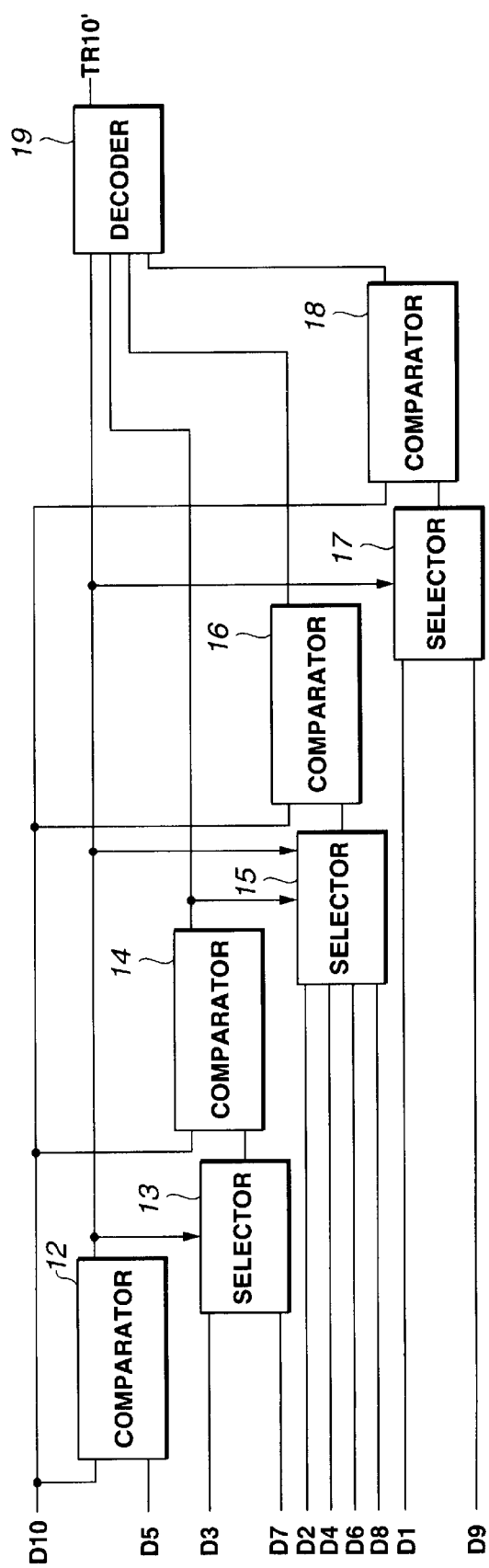
FIG. 5 is a block diagram illustrating the internal configuration of a part of a comparison circuit shown in FIG. 1.

Next, the comparison circuit 3 outputs selection signals indicating the order of magnitude of respective ones of the new data D10–D12 with respect to the already ranked old data D1–D9 (step S103). FIG. 5 is a diagram illustrating the internal configuration of a circuit, constituting the comparison circuit 3, for comparing the magnitude of the minimum value D10 of the new data C10–C12 with the magnitude of the already ranked old data D1–D9. These old data D1–D9 are obtained by arranging the old data C1–C9 in the order of magnitude, so that D1 is the minimum value and D9 is the maximum value. Although not illustrated, a similar circuit is included in the comparison circuit 3 for each of data D11 and D12. In FIG. 5, there are shown comparators 12, 14, 16 and 18, selectors 13, 15 and 17 for selecting data in accordance with the outputs of the comparators 12, 14, 16 and 18, and a decoder 19 for outputting a selection signal TR10' in accordance with the outputs of the comparators 12, 14, 16 and 18.

In the above-described configuration, first, the comparator 12 compares the new data D10 with data D5 positioned at the center from among the already ranked old data D1–D9, and outputs the result of the comparison. This result of the comparison is transmitted to the selector 13, which outputs old data D3 or D7 in accordance with the magnitudes of data D10 and D5. The new data D10 and the output of the selector 13 are input to the comparator 14, which outputs the result of comparison. The results of comparison of the comparators 12 and 14 are transmitted to the selector 15, which selects one of the old data D2, D4, D6 and D8 in accordance with the two results of comparison and outputs the selected data to the comparator 16. The comparator 16 compares the new data D10 with the output of the selector 15, and outputs the result of the comparison. The output of the comparator 12 is input to the selector 17, which outputs old data D1 or D9 in accordance with the result of the comparison. The comparator 18 compares the output of the selector 17 with the new data D10, and outputs the result of the comparison. The outputs of the comparators 12, 14, 16 and 18 are input to the decoder 19, which outputs the selection signal TR10' indicating the order of magnitude of the new data D10 with respect to the old data D1–D9. The selection signal TR10' may be represented in various forms. For example, when the new data D10 is larger than D1–D4 and smaller than D5–D9 from among the old data D1–D9, the order of magnitude of the new data D10 with respect to the old data D1–D9 can be represented by a 9-bit digital signal "111100000" (each bit corresponds to one of the data D1–D9, "1" indicating the corresponding data is smaller than D10, and "0" indicating that the corresponding data is larger than D10).

The selection signal TR10' which has been thus generated and selection signals TR11' and TR12' which have been generated in the same manner are input to the selection-signal generation circuit 4. The selection-signal generation circuit 4 outputs signals indicating the order of magnitude of data D1–D12, and each indicating whether or not the concerned data is to be removed (step S104).

Figure 6:
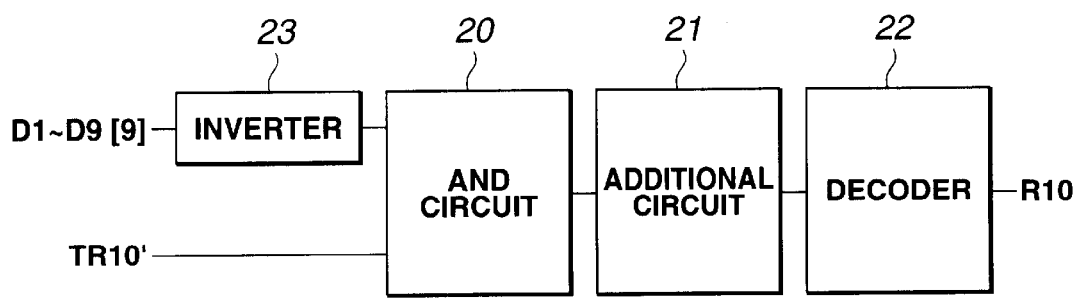
FIGS. 6 and 7 are block diagrams, each illustrating the internal configuration of a selection-signal generation circuit shown in FIG. 1.
Figure 7:
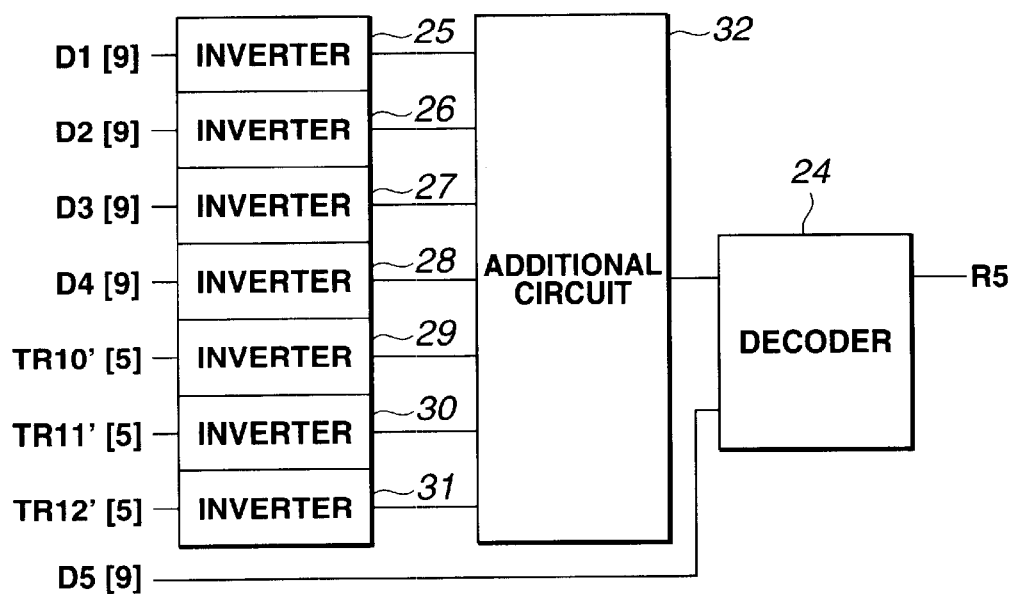

FIGS. 6 and 7 illustrate the internal configuration of the selection-signal generation circuit 4.

FIG. 6 is a circuit for generating a selection signal R10 indicating the order of magnitude of the signal level of the new data D10 in nine data within the new region, from column information (to be described later) added to the old data and the selection signal TR10'. A similar circuit is also provided for each of the new data D11 and D12. The selection signals TR11' and TR12' are input to corresponding ones of these circuits, instead of the selection signal TR10'.

Figure 8:
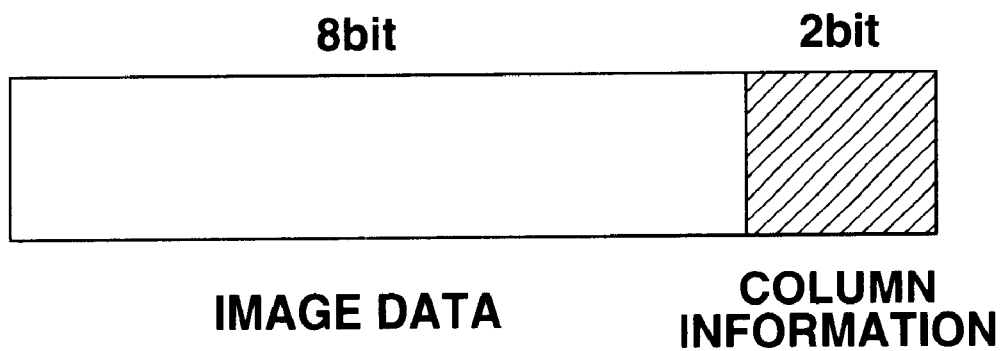
FIG. 8 is a diagram illustrating the configuration of each data.

Each of the data D1–D12 has the configuration shown in FIG. 8. Each data is 10-bit data including 8-bit image data and 2-bit column information. The column information is represented by "00" when the data has been newly added to a region to be subjected to filtering processing and the processing has been terminated, and is incremented by "01" every time the target pixel is shifted by one and filtering processing is terminated (i.e., every time there is an output from the all-data selection circuit 5. Accordingly, column information added to data leaving the region to be subjected to filtering processing is represented by "10". Hence, only data in which the second bit of the column information is 1 is to be removed from among the old data.

In FIG. 6, an AND circuit 20 receives 9-bit data obtained by sequentially arranging second-bit signals of respective sets of column information of the old data D1–D9 (i.e., ninth-bit signals of the old data D1–D9) and the selection signal TR10' of the new data D10 as input signals. An addition circuit 21 adds respective bits of an output signal from the AND circuit 20. A decoder 22 generates a selection signal R10 indicating the order of magnitude of the data D10 in the new pixel region, based on an output from the addition circuit 21.

In the above-described configuration, the selection signal TR10', serving as one of two input signals to the AND circuit 20, is a 9-bit signal indicating the order of magnitude of the data D10 with respect to the data D1–D9, as described above. A signal obtained by passing the second-bit signal of the column information of each of the data D1–D9, serving as another input signal to the AND circuit 20, is a signal indicating whether or not each the data D1–D9 is within the pixel region to be subjected to filtering processing when the target pixel shifts by one. Accordingly, by obtaining AND of these two signals, it is possible to change a signal of a bit corresponding to data which is smaller than the data D10 and which is not to be subjected to filtering processing after the shift of the target pixel from among 9 bits of the selection signal TR10', from 1 to 0. Furthermore, by adding respective bits of the output signal of the AND circuit 20 by the addition circuit 21, it is possible to know the number of data smaller than the new data D10 from among old data remaining to be subjected to be new filtering processing. Since the new data D10–D12 have the relationship of D10≦D11≦D12, a value obtained by adding one to the output of the addition circuit 21 is the order of magnitude of the new data D10 in the new region to be subjected to filtering processing. Then, the output of the addition circuit 21 is input to the decoder 22, which generates the selection signal R10 for rearranging the data D10.

By using a similar circuit, it is possible to know the number of data smaller than the new data D11 and D12 from among old data remaining to be subjected to new filtering processing. By taking into consideration of the relationship of D10≦D11≦D12 (i.e., +2 for the data D11, and +3 for the data D12), the order of magnitude of each of the new data D11 and D12 in the new region to be subjected to filtering processing is calculated, and selection signals R11 and R12 for rearranging the data D11 and D12, respectively, are generated.

Each of the selection signals R10–R12 is a 9-bit digital signal in which only a bit corresponding the order is 1, for example, "000010000" if the data D10 is the fifth largest data within the new region to be subjected to filtering processing.

FIG. 7 is a diagram illustrating the configuration of a circuit for generating a selection signal for determining the order of magnitude of old data in the new region to be subjected to filtering processing, in the selection-signal generation circuit 4, for a case of determining the order of magnitude of data D5. Although not illustrated, a similar configuration is provided for each of the data D1–D9.

In FIG. 7, there are shown an addition circuit 32 and a decoder 24. The upper bit (i.e., the ninth-bit signal of the signal shown in FIG. 8) of the column information of each of data D1–D4 smaller than the data D5 and the fifth-bit signal of each of the selection signals TR10'–TR12' are input to the addition circuit 32 via corresponding ones of inverters 25–31. Thus, it is possible to calculate the sum of the number of data included in the new region to be subjected to filtering processing from among the data D1–D4, and the number of data smaller than the data D5 from among the new data D10–D12. The number of the sum output form the addition circuit 32 and the upper bit of the column information of the data D5 are input to the decoder 24. If the upper bit of the column information of the data D5 is "1", all of the selection signals are made "0". If the upper bit of the column information of the data D5 is "0", 1 is added to the sum of the addition circuit 32, and a selection signal R5 for rearranging the data D5 is generated.

By performing the same operation as described above, selection signals R1–R9 are generated. The number of input terminals and the types of signals change in the following manner. That is, when generating a signal R1, first-bit signals of the signals TR10'–TR12' and the upper bit of the column information of the data D1 are input. When generating a signal R2, second-bit signals of the signals TR10'–TR12' and the upper bits of the respective sets of column information of the data D1 and D2 are input. When generating a signal R3, third-bit signals of the signals TR10'–TR12' and the upper bits of the respective sets of column information of the data D1–D3 are input.

A selection signal R5 output from the decoder 24 is a 9-bit digital signal in which only a bit corresponding to the order is 1, for example, "001000000" if the data D5 is the third largest data within the new region to be subjected to filtering processing. Three data in which the upper bit of the column information is "1" from among the data D1–D9 are outside the new region to be subjected to filtering processing. When the column information of data within the data D1–D9 is confirmed and the upper bit of the column information is determined to be "1" by the decoder 24, the selection signal for such data is "000000000".

Figure 9C:
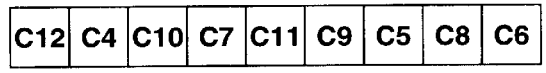

The all-data selection circuit 5 selects one specific data corresponding to the concerned order from among the old data D1–D9 and the new data D10–D12 according to the above-described 9-bit selection signals R1–R12, and rearranges the data as D1'–D9' in the order of magnitude (step S105). For example, from the old data D1–D9 and the new data D10–D12 which are separately ranked as shown in FIG. 9B, unnecessary data are deleted from these two data groups, remaining data are combined, and necessary data are rearranged by the all-data selection circuit 5, as shown in FIG. 9C. Data at the center of the rearranged data group (C11 in the case of FIG. 9C) is output from a medial-filter processing circuit (not shown) provided at the following stage.

As described above, when the target pixel shifts by one, it is unnecessary to delete data of a column which becomes unnecessary, from already ranked data within a region to be subjected to filtering processing, and it is only necessary to perform a single operation of changing data. Hence, it is possible to shorten a series of processing procedures performed when the target pixel shifts, and achieve the reduction of the circuit scale, and high-speed filtering processing.

Next, a description will be provided of an embodiment of the present invention in which processing by a median filter is switched on/off by setting a mode using the same hardware configuration as in the above-described embodiment. It is assumed that median-filter processing in which an area to be subjected to filtering processing includes 3×3 pixels shown in the above-described embodiment can be switched on/off for each frame, for example, using a mode setting switch (now shown).

Figure 10:
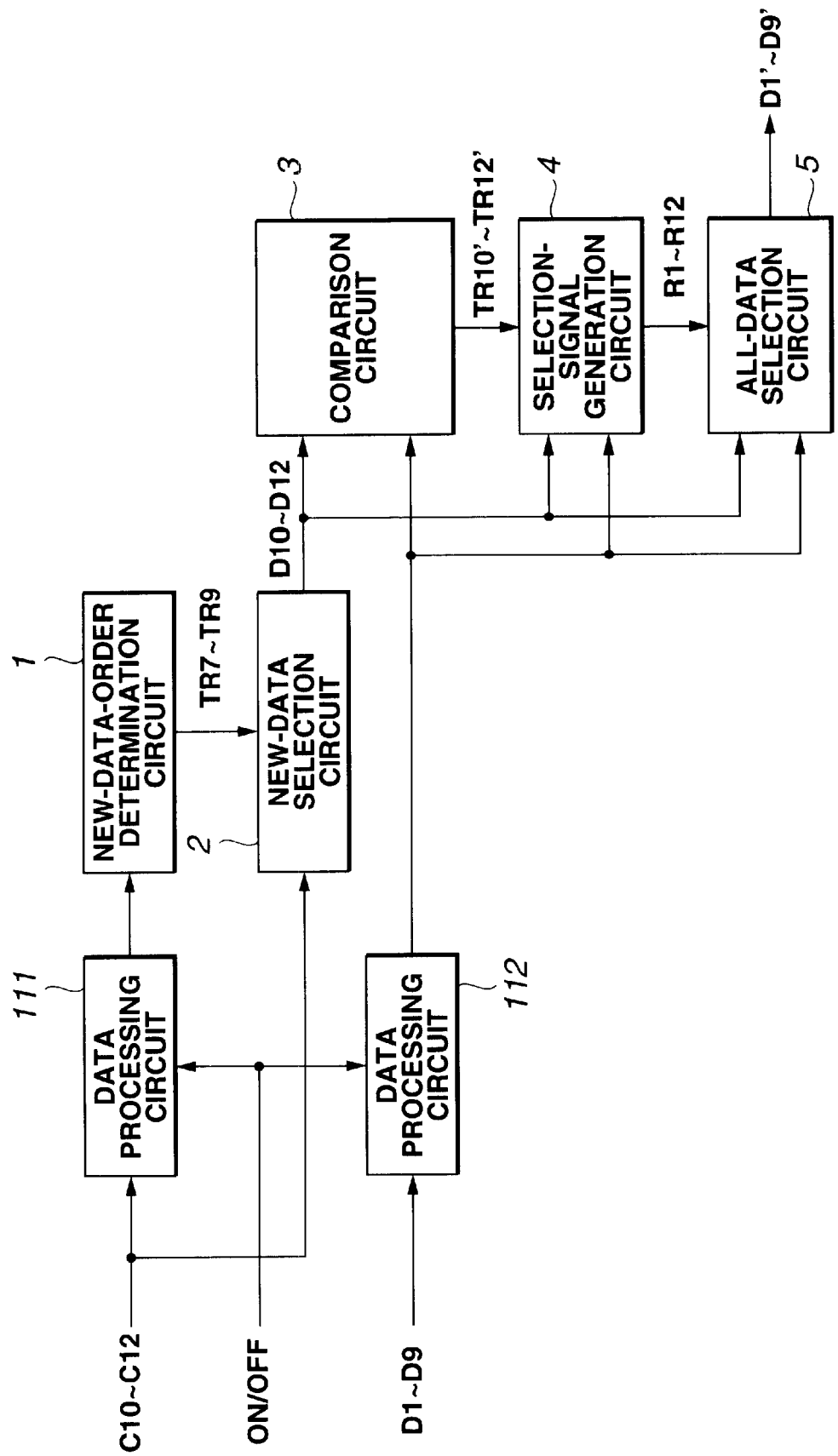
FIG. 10 is a block diagram illustrating the configuration of a median filter according to a second embodiment of the present invention.

FIG. 10 is a block diagram illustrating the configuration of a median filter having a mode setting switch. Although the hardware configuration of the median filter is the same as the configuration shown in FIG. 1, a mode signal indicating an on/off state of the median filter is input, and the contents of processing are changed. FIG. 20 is a flowchart illustrating processing in the configuration of FIG. 10. In FIG. 10, the same components as those shown in FIG. 1 are indicated by the same reference numerals, and further description thereof will be omitted. Each of data processing circuits 111 and 112 holds, from among new data, necessary data in their original values and unnecessary data by rewriting them into specific values for a period of one pixel.

First, in step S201, it is determined if the mode setting switch indicates an on-state of median-filter processing. If the result of the determination in step S201 is affirmative, the process proceeds to ①, where the data processing circuits 11 and 12 do not perform any particular processing and directly output input signals. Filtering processing is performed according to the above-described approach described with reference to FIG. 19.

Figure 11:
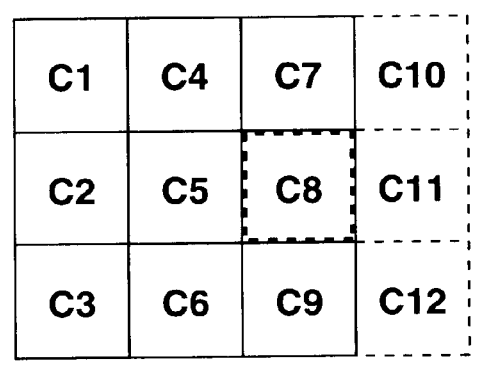

If the result of the determination in step S201 is negative, the following processing is performed considering filtering processing when a region to be subjected to filtering processing corresponds to only the target pixel. Accordingly, in contrast to the relationship between the region to be subjected to filtering processing and the target pixel when the filtering processing is in an on-state shown in FIG. 2, the relationship between the region to be subjected to filtering processing and the target pixel is as shown in FIG. 11. As shown in FIG. 11, only the pixel C5 surrounded by solid lines corresponds to the region to be subjected to filtering processing when the pixel C5 is made the target pixel. When the target pixel shifts from the pixel C5 to the right by one to the pixel C8, the region to be subjected to filtering processing shifts from the pixel C5 surrounded by the thick lines to the pixel C8 surrounded by broken lines.

Signal processing when filtering processing by the median filter having the above-described configuration is in an off-state will now be described in accordance with the flow of data.

When the mode in which the filtering processing is in an off-state is set, in new data C10–C12 input to the data processing circuit 111, data C10 and data C12 are replaced with 10 and 255, respectively, and data C11 maintains its original value. These values are held while one target pixel is processed (step S202). New data C7–C9 for the immediately preceding pixel which have been held by the data processing circuit 111 are output to the new-data-order determination circuit 1 (step S203). The magnitudes of data C7–C9 are compared with one another by the new-data-order determination circuit 2, and the order of magnitude of the new data is determined (step S203). The new-data-order determination circuit 1 has the same configuration as that of the first embodiment described with reference to FIG. 3. The decoder 9 outputs a selection signal TR7 indicating the order of magnitude of data C7 from among the data C7–C9. Similarly, the decoder 10 outputs a selection signal TR8 indicating the order of magnitude of data C8 from among the data C7–C9, and the decoder 11 outputs a selection signal TR9 indicating the order of magnitude of data C9 from among the data C7 C9.

The new data C7–C9 and the selection signals TR7–TR9 as the outputs of the new-data-order determination circuit 1 are input to the new-data selection circuit 2, which rearranges the new data C7–C9 in the ascending order of magnitude as D10, D11 and D12 having the relationship of $D10 \leq D11 \leq D12$ (step S205). Since the values of the data C7 and the data C9 have been replaced with 0 and 255, respectively, by the data processing circuit 111 and only the data C8 is held in its original value, the new data C7–C9 necessarily have the relationship of $C7 \leq C8 \leq C9$.

Figure 12A:
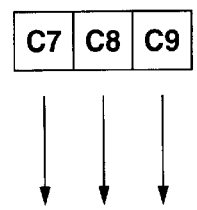
FIGS. 12A–12C are diagrams illustrating a schematic procedure of rearrangement of signals according to the second embodiment.
Figure 12B:
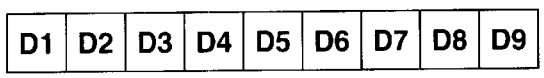
Figure 12B:
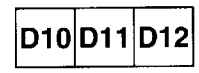

Accordingly, D10=C7, D11=C8, and D12=C9, according to processing of changing signals from FIG. 12A to FIG. 12B.

The new data D10–D12 and the already ranked old data D1–D9 are input to the comparison circuit 3. In FIG. 10, when the mode in which the filtering processing is in an off-state is set, the data D1–D3 and the data D7–D9 are rewritten into 0 and 255, respectively, by the data processing circuit 112, and only data D4–D6 hold their original values. These data are input to the comparison circuit 3 (step S206). The comparison circuit performs the same processing as in the case of FIG. 2 based on these input signals, and outputs selection signals TR10'–TR12' indicating the relationship among the magnitudes of the new data D10–D12 and the old data D1–D9 (step S207).

Figure 12C:
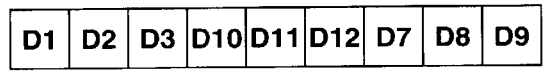
Figure 13:
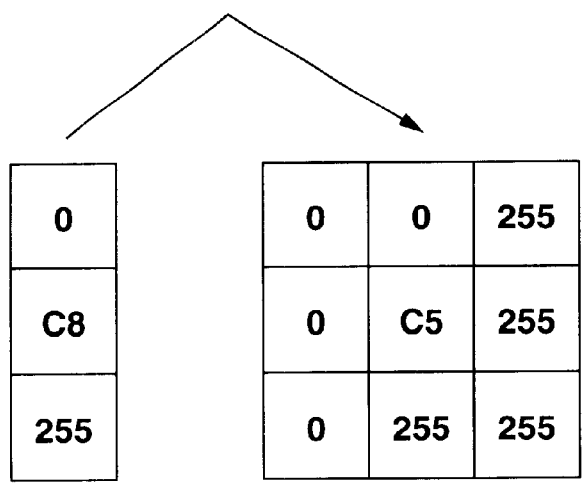
FIG. 13 is a diagram illustrating the values of signals within a region to be subjected to filtering processing in the second embodiment.

Then, the signals TR10'–TR12', and the old data D1–D9 changed by the data processing circuit 112 are input to the selection-signal generation circuit 4, which generates selection signals R1–R12 (step S208). In this step, processing of changing signals from the state shown in FIG. 12B to the state shown in FIG. 12C is performed. That is, the data D1–D3 and D7–D9 are not changed, and only signals of the column including the target pixel are changed.

As shown in FIG. 8, each of the data D1–D12 has two-bit column information. Since data to be removed from the region to be subjected to filtering processing are data D4–D6 of the column including the immediately preceding target pixel, data having column information of "01" are removed. That is, in the case in which the median filter is in an on-state, the selection-signal generation circuit 4 uses second-bit signals D1–D9 of the column information of the data D1–D9, respectively. However, in the case in which the median filter is on an off-state, 9-bit data obtained by sequentially arranging the first-bit signals D1–D9 [10] of the column information of the data D1–D9, respectively, is used, and a selection signal R10 is output using this data and, for example, the selection signal TR10' of the new data D10.

In this case, as described above, since the data D1–D3 have been changed to 0 by the data processing circuit 111, the order of magnitude of these data is from 1 to 3, and since the data D7–D9 have been changed to 255, the order of magnitude of these data is from 7 to 9. Since the data D4–D7 are removed from the column information, R4–R6 are represented by "000000000". Accordingly, the new data D10–D12 have medium orders of magnitude within the region to be subjected to filtering processing. However, as described above, since the data D10 and D12 have been changed to 0 and 255, respectively, by the data processing circuit 111, data at the center of a data group arranged in the order of magnitude of signal levels which is output from the all-data selection circuit 5 is necessarily D11, i.e., data C8 (step S209).

FIGS. 12A–12C and 13 illustrate the manner of the above-described data processing. Data other than the target pixel in the column including the target pixel are rewritten into 0, which is the minimum value of data, or 255, which is the maximum value of data, and only the target pixel uses its original value. The data D1–D3 are always fixed to the minimum value, and the data D7–D9 are always fixed to the maximum value. The data D4–D6 are determined to be unnecessary when the target pixel shifts by one, based on column information.

Usually, the case of requiring on/off switching of filtering processing frequently occurs depending on the photographing situation. As described above, since on/off switching of filtering processing can be realized only by adding some circuits to the hardware configuration of FIG. 1, it is possible to provide a median filter with a low cost and without reducing the processing speed of the filter.

In the following embodiment of the present invention, a description will be provided of a case in which a region to be subjected to filtering processing is switched by setting a mode, by applying the circuit configuration shown in FIG. 10.

FIG. 14 illustrates the movements of a target pixel and a region to be subjected to median-filter processing when the region includes 5×5 pixels. When the target pixel is a pixel C13, the region to be subjected to filtering processing includes pixels C1–C25. If the target pixel shifts to a pixel C18, the region to be subjected to filtering processing shifts to a region including pixels C6–C30. When 5×5 pixels around the target pixel constitute a region to be subjected to filtering processing as in this case, also, although the circuit scale increases, an efficient median filter can be provided according to the same approach as in the first embodiment. By adding circuitry equivalent to the circuitry used in the second embodiment, an area size adapted to the photographing situation can be set not only by switching on/off filtering processing but also by switching the region to be subjected to filtering processing depending on the photographing situation. A case of performing filtering processing by switching the region to be subjected to filtering processing will now be described with reference to FIGS. 16 and 17.

Figure 15:
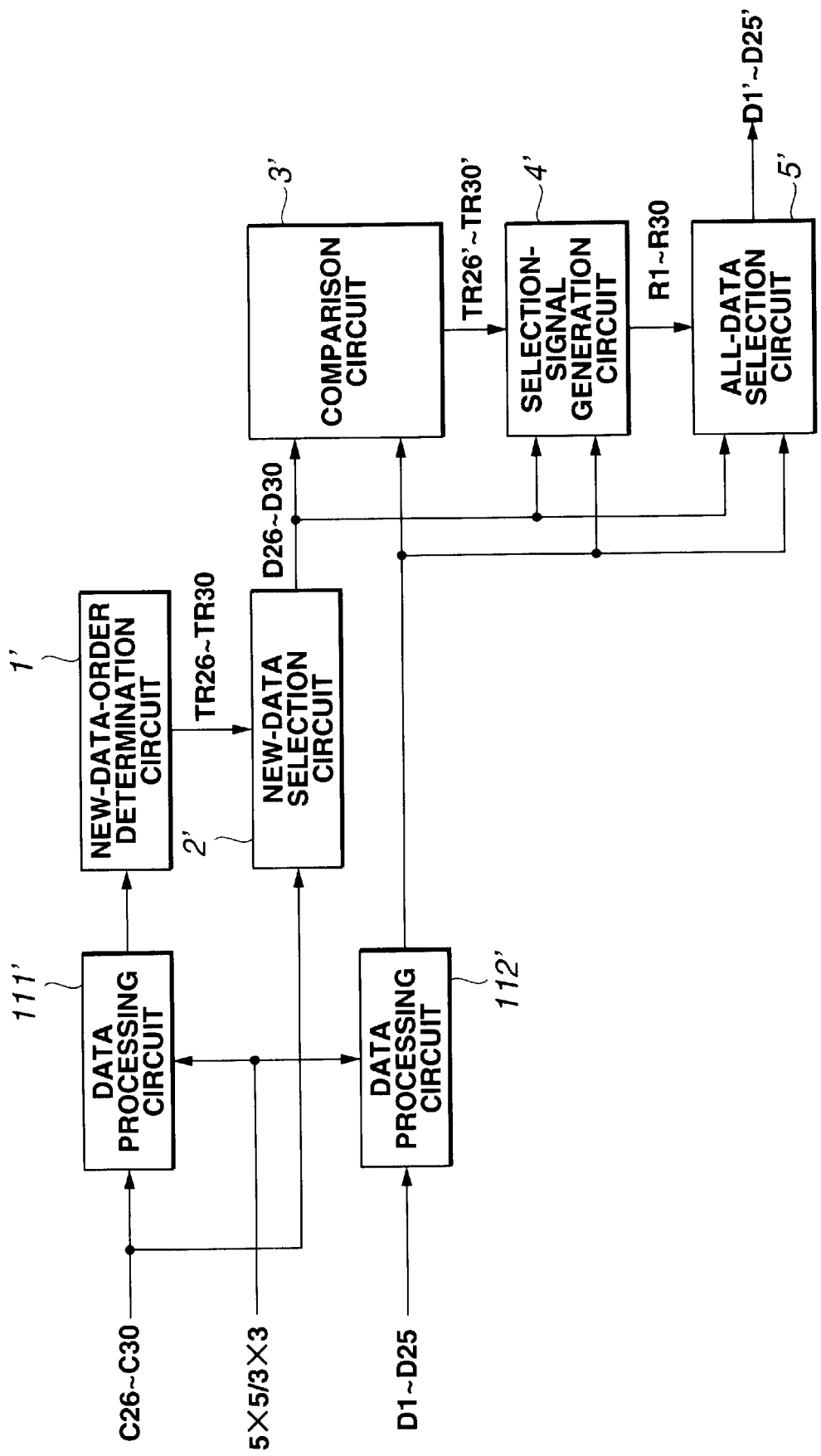
FIG. 15 is a block diagram illustrating the configuration of a median filter according to the third embodiment.

FIG. 15 illustrates the configuration of a median filter which can change the number of pixels to be subjected to filtering processing according to the third embodiment. Although the median filter shown in FIG. 15 has basically the same configuration as the configuration of the median filter described with reference to FIG. 10, the configuration shown in FIG. 14 differs from the configuration shown in FIG. 10 in that data processing for a region including 5×5 pixels can be performed, and that data processing circuits 111' and 112' change processing based on a signal for switching the region to be subjected to filtering processing, instead of a signal for switching on/off filtering processing.

FIG. 16 illustrates each target pixel and a corresponding region to be subjected to filtering processing when performing median-filter processing in which a region to be subjected to filtering processing includes 3×3 pixels, using a signal processing apparatus for a median filter in which a region to be subjected to filtering processing includes 5×5 pixels.

Next, a description will be provided of a case of performing data processing of a region including 3×3 pixels in a median filter which can perform data processing for a region including 5×5 pixels.

Figure 17:
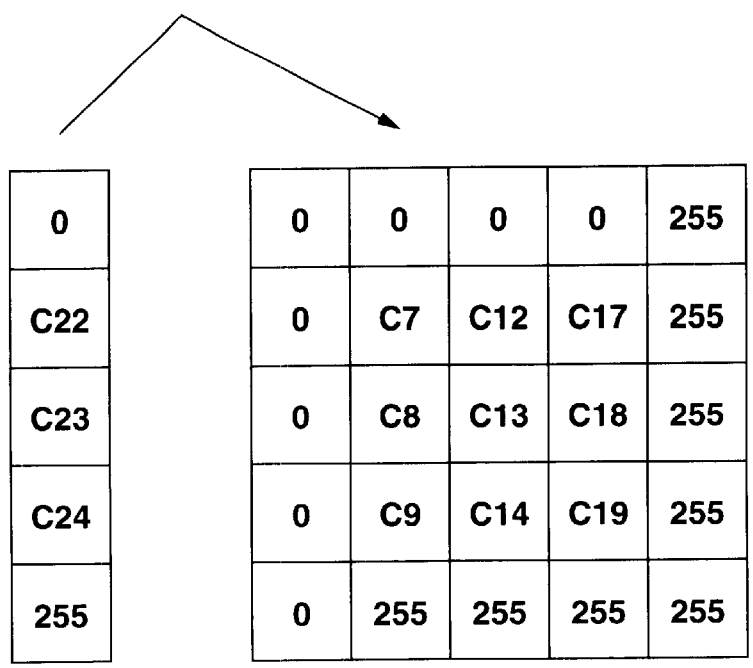
FIG. 17 is a diagram illustrating the values of signals within a region to be subjected to filtering processing in the third embodiment.
Figure 18A:
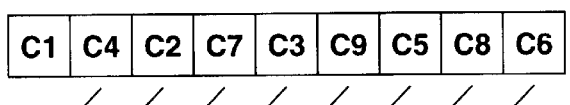
FIGS. 18A–18G are diagrams illustrating a schematic procedure of rearrangement of signals in a conventional approach.
Figure 18B:
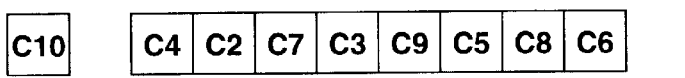
Figure 18C:
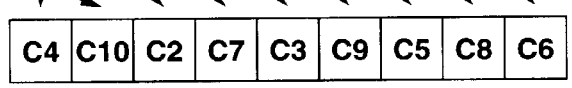
Figure 18D:
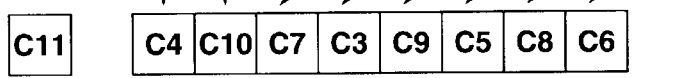
Figure 18E:
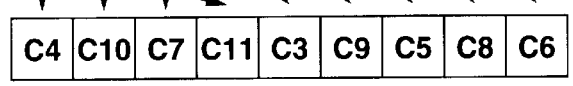
Figure 18F:
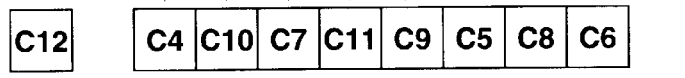
Figure 18G:
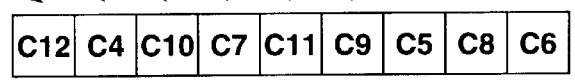

FIG. 17 illustrates the concept of replacement of data and input positions in this case. Data for one column D1–D5 are fixed to the minimum value 0 which can be provided by the data processing circuit 112', and data for another column D21–D25 are fixed to the maximum value 255. Although three data at the center of each column from among five data in the column are input with their original values, one data is input by being replaced with the minimum value 0, and another data is input by being replaced with the maximum value 255. Thus, since 8 maximum values and minimum values are present in the data within the region to be subjected to filtering processing, ranking of data C7–C9, C12–C14, and C17–C19 can be performed using a filter circuit corresponding to a region including 5×5 pixels.

Nine data at the center of 25 data in the order of magnitude of the 25 data are necessarily the data of nine central pixels C7–C9, C112–C14, and C17–C19. When the target pixel shifts by one, the column including the data C7–C9 is removed from column information, and five data including data C22–C24 and the minimum value 0 and the maximum value are newly added to the region. By performing ordinary processing for 5×5 pixels, processing for 3×3 pixels corresponding to the next target pixel can be performed. It can be easily realized to newly add processing for 1×1 pixel, i.e., setting of a mode of switching off the median filter shown in FIG. 10, to the configuration of FIG. 15.

As described above, according to the configuration of FIG. 15, it is possible to provide a median filter which can perform appropriate filtering processing by changing the size of the region to be subjected to filtering processing in accordance with the photographing situation, with a low cost and without causing a decrease in the processing speed of filtering processing.

As described above, according to the above-described embodiments, every time the region to be subjected to filtering processing shifts, (a) the order of magnitude of new pixel signals newly added to the region to be subjected to filtering processing is provided, (b) the order of magnitude of all data in the region to be subjected to filtering processing after the shift is determined by comparing the ranked new pixel signals with already ranked old pixel signals, and (c) only one operation of rearranging data is performed. Thus, it is possible to minimize the number of comparison and rearrangement operations and increase the processing speed with a small circuit scale, when realizing a median filter in the form of hardware.

Furthermore, by providing means for changing the values of pixel signals at predetermined positions of the region to be subjected to filtering processing to a predetermined value, such as a minimum value or a maximum value, it is possible to substantially omit signal processing and narrow the range to be subjected to filtering processing without reducing the signal processing speed while minimizing of the configuration of hardware.

The object of the present invention may also be achieved, for example, by supplying a system or an apparatus with a storage medium storing program codes of software for realizing the functions of the above-described embodiments, and reading and executing the program codes stored in the storage medium by means of a computer (or a CPU or an MPU (microprocessor unit)) of the system or the apparatus.

In such a case, the program codes themselves read from the storage medium realize the functions of the above-described embodiments, so that the storage medium storing the program codes constitutes the present invention.

For example, a floppy disk, a hard disk, an optical disk, a magnetooptical disk, a CD (compact disc)-ROM (read-only memory), a CD-R (recordable), a magnetic tape, a nonvolatile memory card, a ROM or the like may be used as the storage medium for supplying the program codes.

The present invention may also be applied not only to a case in which the functions of the above-described embodiments are realized by executing program codes read by a computer, but also to a case in which an OS (operating system) or the like operating in a computer executes a part or the entirety of actual processing, and the functions of the above-described embodiments are realized by the processing.

The present may also be applied to a case in which, after writing program codes read from a storage medium into a memory provided in a function expanding board inserted into a computer or in a function expanding unit connected to the computer, a CPU or the like provided in the function expanding board or the function expanding unit performs a part or the entirety of actual processing, and the functions of the above-described embodiments are realized by the processing.

When applying the above-described embodiments to the storage medium, program codes corresponding to the above-described flowcharts are stored in the storage medium. Modules indispensable to a signal processing apparatus of the present invention are stored in the storage medium.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A signal processing apparatus for setting a region having a predetermined size in order to process pixel signals in an image pickup device, shifting the set region, and performing signal processing based on pixel signals within each region by sequentially shifting the region, said apparatus comprising:

a first new-data-order determination unit adapted to determine an order of magnitude of levels of pixel signals to be newly subjected to signal processing as a result of a shift of the region;

a new-data rearrangement unit adapted to rearrange new pixel signals to be newly subjected to signal processing, based on the order of magnitude determined by said first new-data-order determination unit;

a second new-data-order determination means adapted to determine an order of magnitude of new pixel signals obtained by combining the new pixel signals rearranged by said new-data rearrangement unit and old pixel signals that have been subjected to signal processing before the shift of the region, and an order of magnitude of signal levels which have been determined, by comparing levels of the new pixel signals rearranged by said new-data rearrangement unit with the levels of the old pixel signals;

an all-data-order determination unit adapted to determine an order of magnitude of signal levels of all pixels obtained by combining the new pixel signals and the old pixel signals, based on the order of magnitude of the new pixel signals determined by said second new-data-order determination unit; and an all-data rearrangement unit adapted to rearrange signals of the all pixels, based on the order of magnitude of the signal levels of all the pixels determined by said all-data-order determination unit.

2. A signal processing apparatus according to claim 1, wherein said all-data-order determination unit determines pixel signals which are outside the region to be subjected to signal processing as a result of the shift of the region, from among the old pixel signals, and wherein said all-data rearrangement unit deletes the pixel signals which have been determined to be outside the region to be subjected to signal processing by said all-data-order determination unit.

3. A signal processing apparatus according to claim 2, wherein each of the old pixel signals has additional information indicating accumulated quantity of outputs from said all-data rearrangement unit, and wherein said all-data-order determination unit determines pixel signals which are outside the region to be subjected to signal processing as the result of the shift of the region, based on the additional information.

4. A signal processing apparatus according to claim 3, wherein the predetermined region is shifted by one column of pixels, and wherein the additional information is column information in the region immediately before the shift of the region.

5. A signal processing apparatus according to claim 2, further comprising:

a selection unit adapted to select and output a signal at a central order from among the signals rearranged by said all-data rearrangement unit.

6. A signal processing apparatus according to claim 1, further comprising:

a mode setting unit adapted to set a range of processing of pixel signals to be processed within the region;

a first changing unit adapted to change, when the range of processing of the pixel signals is set narrower than the region by the setting of said mode setting unit, pixel signals that are not present within the range of processing from among the old pixel signals to a predetermined value, and for outputting the changed old signals to said second new-data-order determination unit, said all-data-order determination unit, and said all-data rearrangement unit; and a second changing unit adapted to change, when the range of processing of the pixel signals is set narrower than the region by the setting of said mode setting unit, pixel signals that are not present within the range of processing from among the new pixel signals to a predetermined value.

7. A signal processing apparatus according to claim 6, wherein said second changing unit outputs the new pixel signals changed by said second changing unit to said first new-data-order determination unit and said new-data rearrangement unit, when the region has subsequently been shifted.

8. A signal processing apparatus according to claim 6, wherein the predetermined value of the pixel signals changed by said first changing unit or said second changing unit is a maximum level or a minimum level allowed for pixel signals.

9. A signal processing method for setting a region having a predetermined size in order to process pixel signals in an image pickup device, shifting the set region, and performing signal processing based on pixel signals within each region by sequentially shifting the region, said method comprising:

a first new-data-order determination step of determining an order of magnitude of levels of pixel signals to be newly subjected to signal processing as a result of shift of the region;

a new-data rearrangement step of rearranging new pixel signals to be newly subjected to signal processing, based on the order of magnitude determined in said first new-data-order determination step;

a second new-data-order determination step of determining an order of magnitude of new pixel signals obtained by combining the new pixel signals rearranged in said new-data rearrangement step and old pixel signals which have been subjected to signal processing before the shift of the region, and an order of magnitude of signal levels of which have been determined, by comparing levels of the new pixel signals rearranged in said new-data rearrangement step with the levels of the old pixel signals;

an all-data-order determination step of determining an order of magnitude of signal levels of all pixels obtained by combining the new pixel signals and the old pixel signals, based on the order of magnitude of the new pixel signals determined in said second new-data-order determination step; and an all-data rearrangement step of rearranging signals of the all pixels, based on the order of magnitude of the signal levels of all the pixels determined in said all-data-order determination step.

10. A signal processing method according to claim 9, wherein in said all-data-order determination step, pixel signals which are outside the region to be subjected to signal processing as a result of the shift of the region, from among the old pixel signals, are determined, and wherein in said all-data rearrangement step, the pixel signals which have been determined to be outside the region to be subjected to signal processing in said all-data-order determination step are deleted.

11. A signal processing method according to claim 10, wherein each of the old pixel signals has additional information indicating accumulated quantity of outputs in said all-data rearrangement step, and wherein in said all-data-order determination step, pixel signals which are outside the region to be subjected to signal processing as the result of the shift of the region are determined, based on the additional information are determined.

12. A signal processing method according to claim 11, wherein the predetermined region is shifted by one column of pixels, and wherein the additional information is column information in the region immediately before the shift of the region.

13. A signal processing method according to claim 11, further comprising:

a selection step of selecting and outputting a signal at a central order from among the signals rearranged in said all-data rearrangement step.

14. A signal processing method according to claim 9, further comprising:

a mode setting step of setting a range of processing of pixel signals to be processed within the region;

a first changing step of changing, when the range of processing of the pixel signals is set narrower than the region by the setting in said mode setting step, pixel signals that are not present within the range of processing from among the old pixel signals to a predetermined value, and for outputting the changed old signals; and a second changing step of changing, when the range of processing of the pixel signals is set narrower than the region by the setting in said mode setting step, pixel signals that are not present within the range of processing from among the new pixel signals to a predetermined value.

15. A signal processing method according to claim 14, wherein in said second changing step, the new pixel signals changed in said second changing step are output, when the region has been shifted.

16. A signal processing method according to claim 14, wherein the predetermined value of the pixel signals changed in said first or second changing step is a maximum level or a minimum level allowed for pixel signals.

17. A storing medium storing a program for a signal processing method for setting a region having a predetermined size in order to process pixel signals in an image pickup device, shifting the set region, and performing signal processing based on pixel signals within each region by sequentially shifting the region, said method comprising:

a first new-data-order determination step of determining an order of magnitude of levels of pixel signals to be newly subjected to signal processing as a result of shift of the region;

a new-data rearrangement step of rearranging pixel signals to be newly subjected to signal processing, based on the order of magnitude determined in said first new-data-order determination step;

a second new-data-order determination step of determining an order of magnitude of new pixel signals obtained by combining the new pixel signals rearranged in said new-data rearrangement step and old pixel signals which have been subjected to signal processing before the shift of the region, and an order of magnitude of signal levels of which have been determined, by comparing levels of the new pixel signals rearranged in said new-data rearrangement step with the levels of the old pixel signals;

an all-data-order determination step of determining an order of magnitude of signal levels of all pixels obtained by combining the new pixel signals and the old pixel signals, based on the order of magnitude of the new pixel signals determined in said second new-data-order determination step; and an all-data rearrangement step of rearranging signals of all the pixels, based on the order of magnitude of the signal levels of all the pixels determined in said all-data-order determination step.

18. A storage medium according to claim 17, wherein in said all-data-order determination step, pixel signals which have left the region to be subjected to signal processing as a result of the shift of the region from among the old pixel signals are determined, and wherein in said all-data rearrangement step, the pixel signals which have been determined to be outside the region to be subjected to signal processing in said all-data-order determination step are deleted.

19. A storage medium according to claim 18, wherein each of the old pixel signals has additional information indicating accumulated quantity of outputs in said all-data rearrangement step, and wherein in said all-data-order determination step, pixel signals which are outside the region to be subjected to signal processing as the result of the shift of the region are determined, based on the additional information are determined.

20. A storage medium according to claim 19, wherein the predetermined region is shifted by one column of pixels, and wherein the additional information is column information in the region immediately before the region is shifted.

21. A storage medium according to claim 19, said method further comprising:

a selection step of selecting and outputting a signal at a central order from among the signals rearranged in said all-data rearrangement step.

22. A storage medium according to claim 17, said method further comprising:

a mode setting step of setting a range of processing of pixel signals to be processed within the region;

a first changing step of changing, when the range of processing of the pixel signals is set narrower than the region by the setting in said mode setting step, pixel signals that are not present within the range of processing from among the old pixel signals to a predetermined value, and for outputting the changed old signals; and a second changing step of changing, when the range of processing of the pixel signals is set narrower than the region by the setting in said mode setting step, pixel signals that are not present within the range of processing from among the new pixel signals to a predetermined value.

23. A storage medium according to claim 22, wherein in said second changing step, the new pixel signals changed in said second changing step are output, when the region has been shifted.

24. A storage medium according to claim 22, wherein the predetermined value of the pixel signals changed in said first or second changing step is a maximum level or a minimum level allowed for pixel signals.

* * * * *

UNITED STATES PATENT AND TRADEMARK OFFICE
CERTIFICATE OF CORRECTION

PATENT NO. : 6,687,413 B2
DATED : February 3, 2004
INVENTOR(S) : Akihiko Yushiya It is certified that error appears in the above-identified patent and that said Letters Patent is hereby corrected as shown below:

<u>Title page,</u>
Item [30], Foreign Application Priority Data, "Jun. 14, 2000 (JP)…...2000-178294" should be deleted.
Item [57], ABSTRACT,
Line 12, "subjected" should read -- subjected to --.

<u>Column 1,</u>
Line 41, "form" should read -- from --.

<u>Column 5,</u>
Line 35, "pixel CS" should read -- pixel C5 --.

<u>Column 6,</u>
Line 8, "pixels" should read -- pixel --.

<u>Column 7,</u>
Line 58, "circuit 5." should read -- circuit 5). --.

<u>Column 8,</u>
Line 14, "each the" should read -- each of the --; and
Line 66, "form" should read -- from --.

<u>Column 9,</u>
Line 61, "(now shown), should read -- (not shown). --.

UNITED STATES PATENT AND TRADEMARK OFFICE
CERTIFICATE OF CORRECTION

PATENT NO.     : 6,687,413 B2
DATED          : February 3, 2004
INVENTOR(S)    : Akihiko Yushiya It is certified that error appears in the above-identified patent and that said Letters Patent is hereby corrected as shown below:

Column 11,
Line 32, "on" should read -- in --.

Signed and Sealed this

Tenth Day of August, 2004

JON W. DUDAS
*Acting Director of the United States Patent and Trademark Office*